United States Patent
Wu et al.

(10) Patent No.: US 10,452,443 B2
(45) Date of Patent: Oct. 22, 2019

(54) DYNAMIC TUNING OF MULTIPROCESSOR/MULTICORE COMPUTING SYSTEMS

(71) Applicant: Intel Corporation, Santa Clara, CA (US)

(72) Inventors: Keqiang Wu, San Ramon, CA (US); Kingsum Chow, Portland, OR (US); Ying Feng, Santa Clara, CA (US); Khun Ban, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 15/670,525

(22) Filed: Aug. 7, 2017

(65) Prior Publication Data

US 2017/0337083 A1    Nov. 23, 2017

Related U.S. Application Data

(63) Continuation of application No. 14/842,359, filed on Sep. 1, 2015, now Pat. No. 9,760,404.

(51) Int. Cl.
*G06F 9/46* (2006.01)
*G06F 9/50* (2006.01)
(Continued)

(52) U.S. Cl.
CPC .............. *G06F 9/5011* (2013.01); *G06F 1/32* (2013.01); *G06F 11/3006* (2013.01);
(Continued)

(58) Field of Classification Search
None
See application file for complete search history.

(56) References Cited

U.S. PATENT DOCUMENTS 6,813,760 B1    11/2004    Fitzel et al.
7,890,626 B1    2/2011    Gadir
(Continued)

FOREIGN PATENT DOCUMENTS

EP    2602964 A1    6/2013

OTHER PUBLICATIONS

International Preliminary Report on Patentability and Written Opinion issued in PCT Application No. PCT/US2016/044439, dated Mar. 15, 2018, 6 pages.
(Continued)

*Primary Examiner* — Gregory A Kessler
(74) *Attorney, Agent, or Firm* — Grossman, Tucker, Perreault & Pfleger, PLLC

(57) ABSTRACT

Generally, this disclosure provides systems, devices, methods and computer readable media for dynamic tuning of multiprocessor and multicore computing systems to improve application performance and scalability. A system may include a number of processing units (CPUs) and profiling circuitry configured to detect the existence of a scalability problem associated with the execution of an application on CPUs and to determine if the scalability problem is associated with an access contention or a resource constraint. The system may also include scheduling circuitry configured to bind the application to a subset of the total number of CPUs if the scalability problem is associated with access contention.

10 Claims, 6 Drawing Sheets

(51) Int. Cl.
    *G06F 1/32*     (2019.01)
    *G06F 11/34*     (2006.01)
    *G06F 11/30*     (2006.01)

(52) U.S. Cl.
    CPC ...... *G06F 11/3024* (2013.01); *G06F 11/3409* (2013.01); *G06F 11/3442* (2013.01); *G06F 11/3466* (2013.01); *G06F 11/3495* (2013.01); *G06F 2201/81* (2013.01); *G06F 2201/865* (2013.01); *G06F 2201/88* (2013.01); *Y02D 10/34* (2018.01)

(56) References Cited

U.S. PATENT DOCUMENTS

| | | |
|---|---|---|
| 2002/0116469 A1 | 8/2002 | Okuyama |
| 2003/0236816 A1 | 12/2003 | Venkatasubramanian |
| 2012/0180061 A1 | 7/2012 | Rao et al. |
| 2012/0227042 A1 | 9/2012 | Zedlewski |
| 2012/0260258 A1* | 10/2012 | Regini .................. G06F 9/5094 718/104 |
| 2016/0378168 A1* | 12/2016 | Branover .............. G06F 1/3287 713/323 |
| 2017/0068297 A1 | 3/2017 | Huang et al. |
| 2017/0192790 A1 | 7/2017 | Robertson et al. |

OTHER PUBLICATIONS

International Search Report and Written Opinion issued in PCT Application No. PCT/US2016/044439, dated Nov. 7, 2016, 9 pages.
SuperMicro, SuperServer 5086B-TRF (Complete System Only), http://www.supermicro.com/products/system/5U/5086/SYS-5086B-TRF.cfm, 2 pages.
Intel: Oracle OpenWorld Keynote Sep. 28, 2014, http://medianetwork.oracle.com/video/player/3811218654001, 1 page.
Hruska, Joel, "Intel Releases rare details of its custom CPUs for Oracle—and there's a lot more to come," http://www.extremetech.com/computing/180755-intel-releases-rare-details-of-its-customized-oracle-cpus-and-there-a-lot-more-to-come, Jul. 29, 2014, 4 pages.
Office Action issued in U.S. Appl. No. 14/842,359, dated Feb. 17, 2017, 15 pages.
Notice of Allowance issued in U.S. Appl. No. 14/842,359, dated May 18, 2017, 5 pages.

* cited by examiner

DYNAMIC TUNING OF MULTIPROCESSOR/MULTICORE COMPUTING SYSTEMS

CROSS-REFERENCE TO RELATED APPLICATION

The present application is a continuation of U.S. patent application Ser. No. 14/842,359 filed Sep. 1, 2015, the entire disclosure of which is incorporated herein by reference.

FIELD

The present disclosure relates to multiprocessor and multicore computing systems, and more particularly, to dynamic tuning of multiprocessor and multicore computing systems to improve application performance and scalability.

BACKGROUND

Computer and communications systems, including mobile platforms, are being offered with increasing numbers of processors (e.g., Central Processing Units or CPUs) and increasing numbers of processor cores (e.g., hardware cores) integrated on those CPUs. This is generally done to provide greater computing power through increased parallelism. Each hardware core may also include multiple hardware threads (also referred to as logical cores or hyperthreading) to further increase the number of parallel operations. Unfortunately, software applications are often not designed to take advantage of this parallelism and, in fact, may actually suffer in performance as hardware is upgraded to offer more parallel processing capability. This can be caused, for example, by relatively inefficient synchronization between the various components of the software (e.g., processes and/or software threads) that are partitioned out for parallel execution. It may also be caused by the need to share limited resources among those components. These difficulties may thus limit the scalability of software applications to handle increasing workloads or throughput based only on increased computational power.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for dynamic tuning of multiprocessor and multicore computing systems, including hyperthreading systems, to improve application performance and scalability and to decrease system power consumption. The term "scalability," as used herein, refers to the existence of a relationship (e.g., some degree of proportionality or linearity) between the performance or throughput of a software application and the measured utilization of the processors. Performance or throughput represents some measure of the work accomplished by the software application.

The software application may be distributed for execution over multiple CPUs, processor cores and hardware threads (or logical cores) to execute in a parallel fashion, to at least some degree. These parallel executing components may include, for example, processes and software threads. The execution of the application may be profiled or monitored to evaluate performance and detect scalability problems. A scalability problem may be determined to exist if the processor utilization increases at a faster rate than the application throughput, as will be explained in greater detail below. This may occur, for example, if the application software is not written to handle synchronization issues in a relatively efficient manner, and thus consumes processing cycles waiting for synchronization rather than accomplishing its intended functions.

Analysis may be performed to determine if the cause of those scalability problems is related to access contention or to sharing of constrained resources. Access contention may include, for example, lock contention or data access conflicts between the parallel components of the application, where locks (for example spin locks or other such suitable mechanisms) are employed to provide synchronization between the components. Constrained resources may include, for example, memory caches, execution pipeline buffers and other hardware resources of the CPUs and/or cores. Dynamic tuning (also referred to as balancing or re-balancing) may be performed, based on this analysis, to include re-binding of the application to fewer CPUs, disabling hyperthreading, and/or disabling some cores of a CPU, as will be discussed herein.

Figure 1:
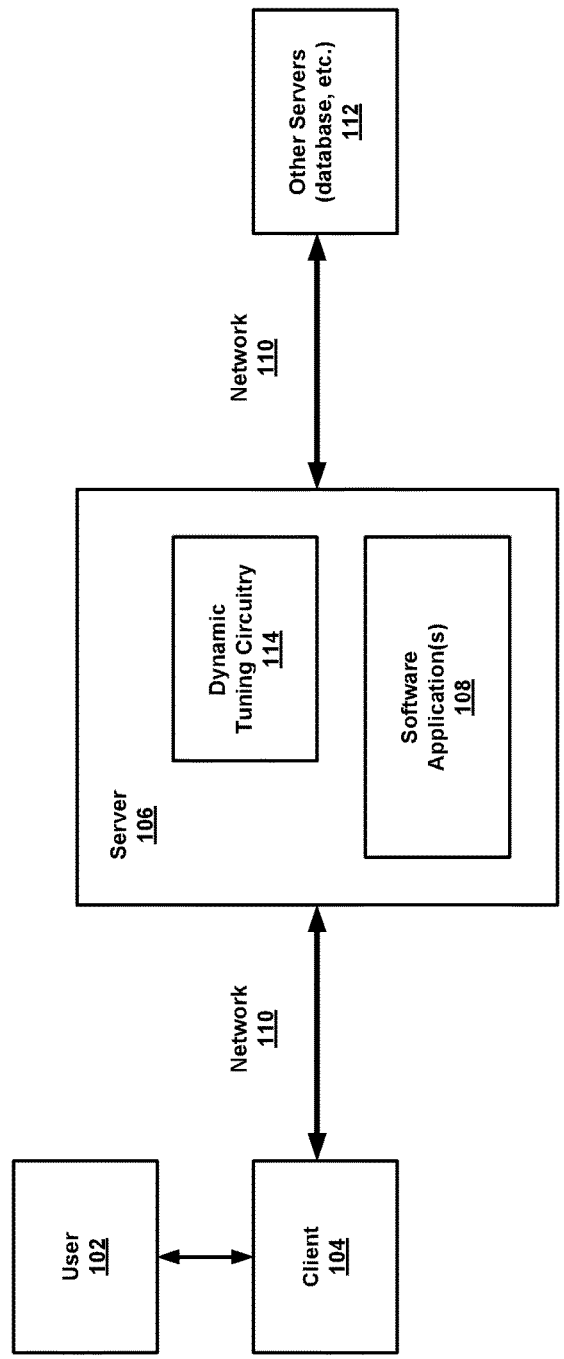
FIG. 1 illustrates a top level system diagram of an example embodiment consistent with the present disclosure.

FIG. 1 illustrates a top level system diagram 100 of one example embodiment consistent with the present disclosure. A user 102 may interact with a local client system 104 to gain access to a remote server system 106 over a network 110. The server system 106 may be configured to host and execute one or more software applications 108. A software application 108 may be a business/enterprise software application including, but not limited to, for example, Customer Relationship Management software, Enterprise Resource Planning software, Human Capital Management software and Business Intelligence software. The server 106 may be configured to provide access to this enterprise application software 108 to many users 102 and client systems 104. In some embodiments, the user may submit requests to the enterprise application software 108 deployed on the server 106 and the enterprise application executes the requests and communicates results back to the user. The enterprise application software 108 may also communicate with other servers 112, such as, for example, database servers. The other servers 112 may be remote to the server 106 and thus communication between them may also be over the network 110.

The server 106 may include multiple CPUs and processing cores any of which may further be configured for hyperthreading operation. The server 106 is also shown to include dynamic tuning circuitry 114, configured to monitor application performance/throughput, determine whether scalability problems exist (due to contention or constraint issues), and balance or re-balance the distribution of the software applications across the CPUs and cores, as will be described below. The tuning is referred to as dynamic because it may be performed while the application is executing (e.g., in real-time).

Although discussions of various embodiments herein may refer to a server system executing business/enterprise application software, it will be appreciated that the server 106 may be any type of multiprocessor/multicore computation or communication platform and that the software may be any type of software that involves some degree of network communication.

Figure 2:
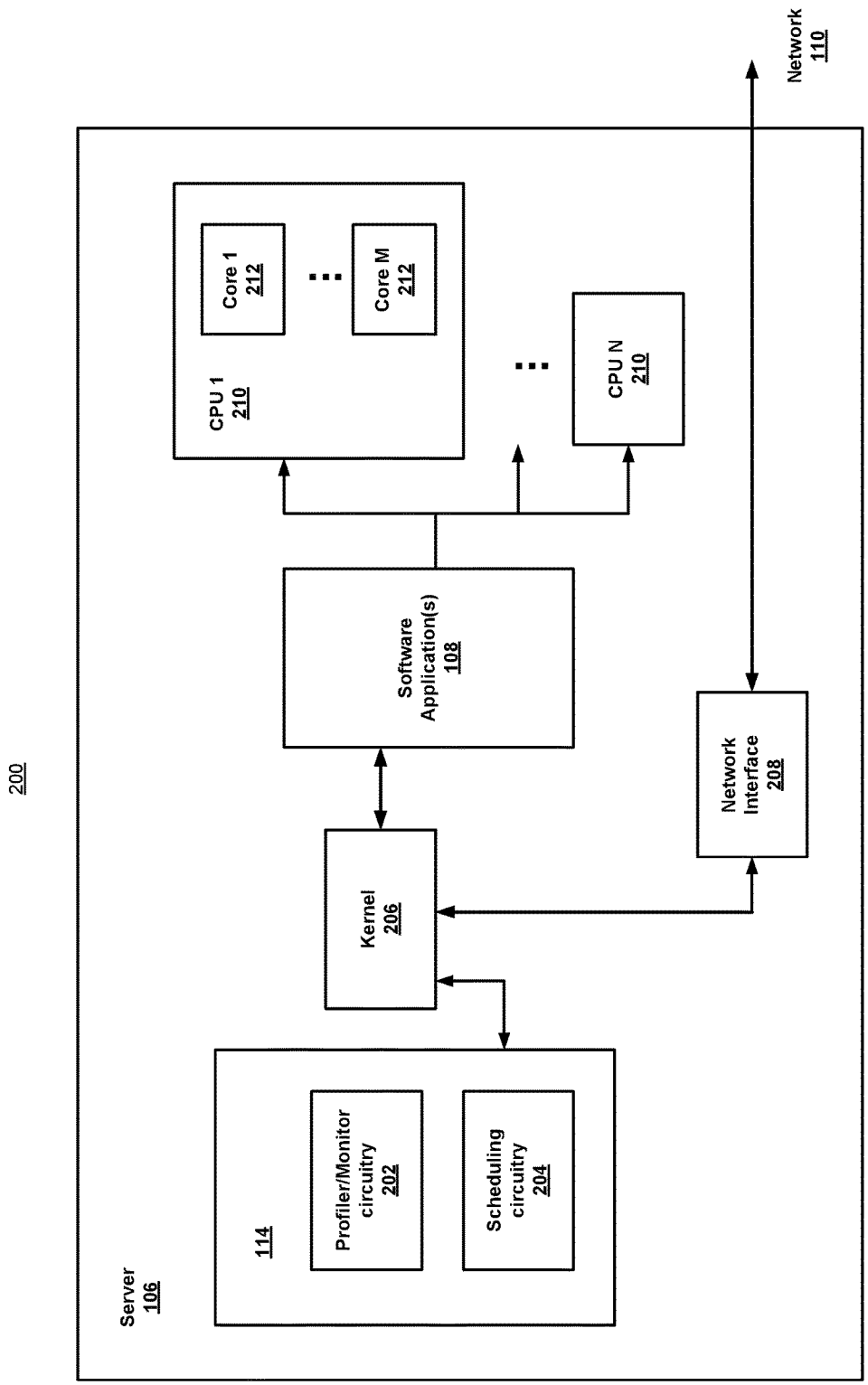
FIG. 2 illustrates a block diagram of one example embodiment consistent with the present disclosure.

FIG. 2 illustrates a block diagram 200 of one example embodiment consistent with the present disclosure. The server 106, is shown to include a Kernel or Operating System (OS) 206, a network interface 208, one or more software applications 108 and the dynamic tuning circuitry 114. The dynamic tuning circuitry 114 may further include profiling (or monitoring) circuitry 202 and scheduling circuitry 204, the operations of which will be described in greater detail below. The server 106 is also shown to include a number (N) of CPUs 210, each of which may include a number (M) of processing cores 212. Each core in turn may be configured to execute multiple hardware threads (e.g., logical cores or hyperthreading). The software applications 108 may thus be distributed into component parts (e.g., processes, software threads, etc.) that execute in parallel, to at least some degree, on each CPU, core and/or logical core.

The kernel 206 may be configured to manage the execution of the software applications 108 and to distribute the component processes of those applications among the various CPUs 210 and cores 212. The kernel 206 may maintain various data structures, such as, for example, a run queue for each CPU listing processes that may be run on that CPU. Additionally, the kernel may maintain a register or bit mask associated with each process, to indicate which cores that process may execute on.

The network interface 208 may be configured to transmit and receive packets, for example data and/or control packets, over the network 110 allowing for communication between the software applications 108 on server 106 and other remote servers or systems. The network interface 208 may also be configured to measure network traffic (e.g., the number of packets transmitted and/or received over a given time period).

Figure 3:
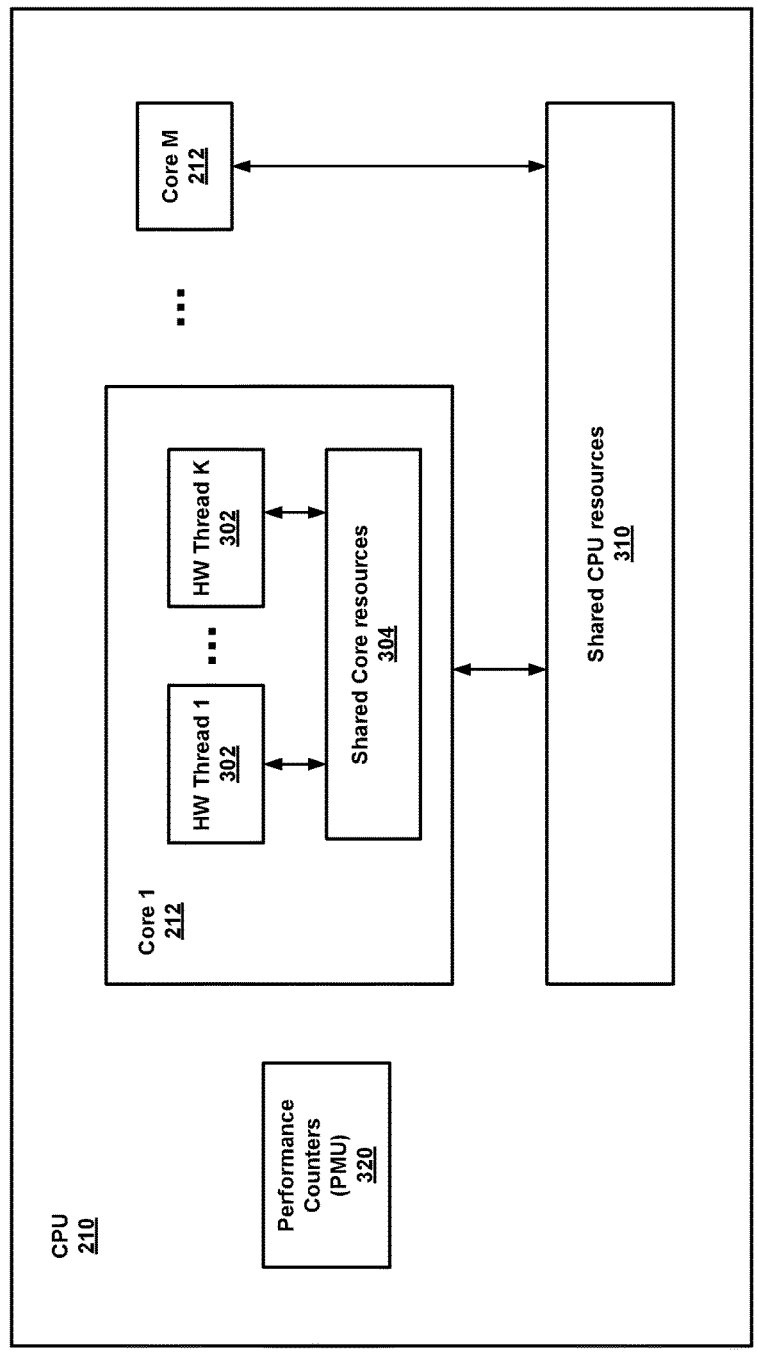
FIG. 3 illustrates a block diagram of another example embodiment consistent with the present disclosure.

Referring now to FIG. 3, the CPUs 210 are shown to include multiple cores 212, each core further including multiple (K) hardware threads or logical cores 302. The CPUs 210 may be configured to provide common resources 310 to be shared, for example, by the cores 212 of that CPU. The cores 212 may be configured to provide common resources 304 to be shared, for example, by the hardware (HW) threads 302 of that core.

Examples of shared core resources 304 may include micro-architecture instruction pipeline resources such as, but not limited to, reorder buffers, load buffers, reservation stations, and level 1 and level 2 caches. Examples of shared CPU resources 310 may include the last level cache (LLC).

Performance counters 320 (also referred to as hardware counters) may also be provided for each CPU 210 and configured to provide event counts, or other statistics, related to various types of hardware utilization events or conditions in a given time period. In some embodiments, the performance counters may be implemented as part of a hardware performance monitoring unit (PMU) integrated with the CPU and the counters may be embodied in registers and/or memory locations that are updated by the PMU and readable by the profiling circuitry 202. For example counters may be provided to indicate the utilization (or available capacity) of any of the instruction pipeline resources (buffers, caches, etc.) which may be associated with instruction pipeline stalling Other counters may be provided to count cache snoop responses indicating that the cache is in a modified state, which may be associated with memory conflicts and possible lock contention. Other counters may be provided to count cache miss rates which may indicate cache capacity constraints or cache conflicts, depending on the values of other performance counters. Still other counters may be provided to track conflicts in address spaces mapped to memory controllers that facilitate sharing of the LLC between cores.

Many types of performance counters may be employed and the above list is not meant to be exhaustive. Some types of counters may indicate that resources are being constrained (e.g., instruction reorder buffer is full) while other types of counters may indicate contention (e.g., cache snoop modified state). In some cases, combinations of different counters may be used to determine if a scalability problem is related to contention or constraints. For example, if the cache miss rate increases, but the cache snoop modified state counter remains at a relatively low level, then the cache miss is more likely due to a capacity constraint than an access conflict.

Additionally, network interface 208 may be configured to provide counters to indicate the number of packets received and/or transmitted to measure network traffic. The throughput or performance of the application may be estimated based on a measurement of network traffic associated with that application, which generally correlates with the quantity of work being accomplished by the application (e.g., page downloads per second, transactions per second, jobs per second, user requests processed per second, etc.). This is particularly true for business/enterprise software applications. The use of measured network traffic associated with an application, as an indicator of application throughput, avoids the need for any a priori knowledge of the specific behavior, inner workings or purpose of the application, which may be difficult to obtain as a general matter. Thus, this method of estimating application throughput may be applied to any application (that employs network communications), from any software vendor, without the need for collaboration with that vendor or an analysis of the application software design.

Profiling circuitry 202 may be configured to: measure CPU utilization (e.g., the percentage of time that the CPU is not idle); to estimate application throughput (e.g., based on network throughput) so as to identify the presence of a scalability issue; and to read and analyze one or more of the performance counters 320 to determine the cause of the scalability issue. In some embodiments, the profiling circuitry 202 may be implemented as a software driver component of the kernel 206 or as a component of the kernel scheduler. The profiling circuitry 202 may obtain information by directly sampling the performance counters (or PMU) or using existing profiling tools such as "EMON," provided by Intel, or "perf," provided by the Linux OS. The operation of the profiling circuitry 202 is described in greater detail below in connection with FIG. 4 and in particular in connection with operations 404, 406, 408, 410 and 414.

Scheduling circuitry 204 may be configured to dynamically balance or re-balance the distribution of the software application components (e.g., processes, software threads, etc.) across the CPUs, cores and logical cores based on the analysis provided by the profiling circuitry 202. This may be accomplished, for example, by re-binding of the application to fewer CPUs, disabling hyperthreading, and/or disabling some cores of a CPU. The operation of the scheduling circuitry 204 is described in greater detail below in connection with FIG. 4 and in particular in connection with operations 412, 416, and 418.

Figure 4:
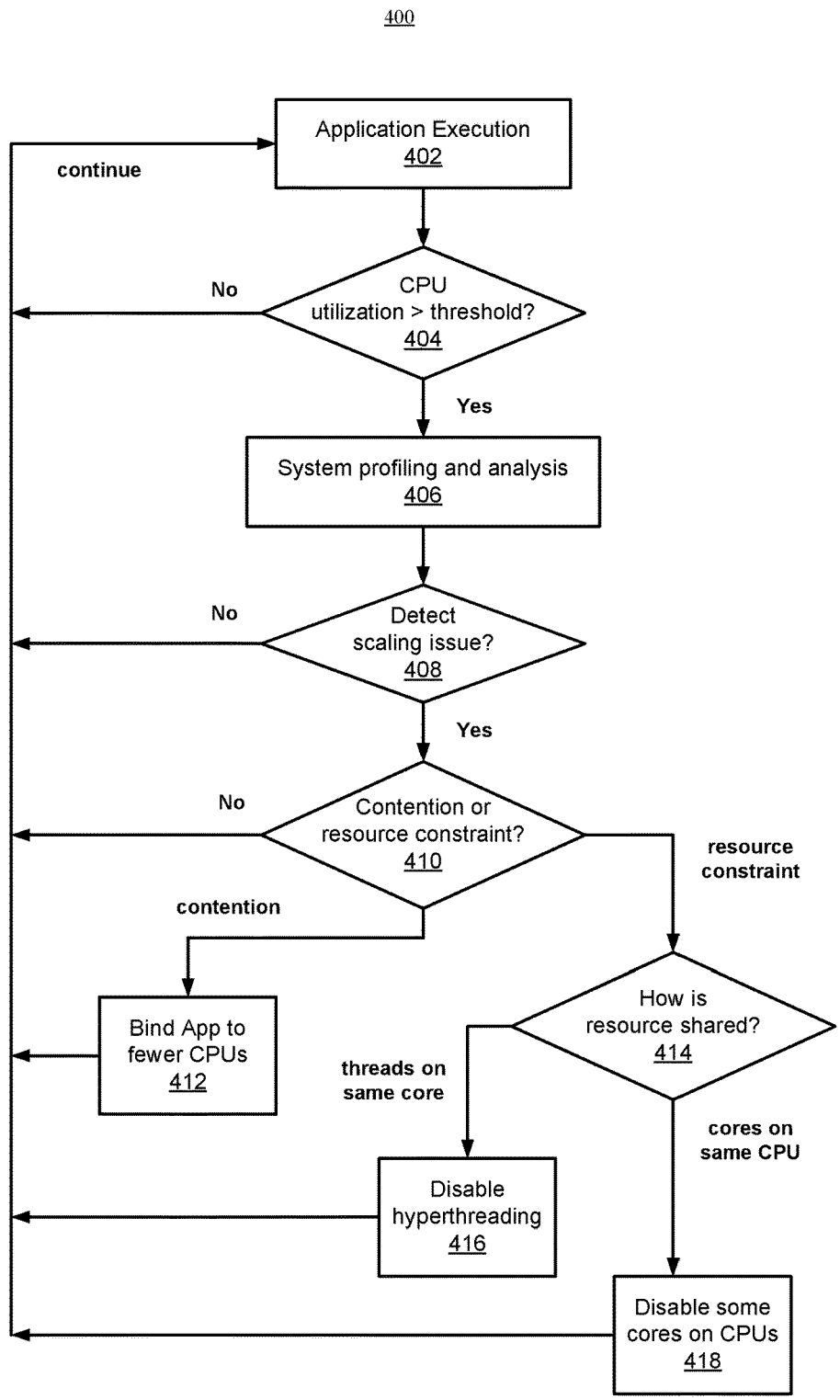
FIG. 4 illustrates a flowchart of operations of one example embodiment consistent with the present disclosure.

FIG. 4 illustrates a flowchart of operations 400 of one example embodiment consistent with the present disclosure. At operation 402, the software application is executing. At operation 404, the CPU utilization is measured and compared to a threshold utilization value. In some embodiments, the threshold utilization value may be in the range of 45 to 55 percent utilization. If the utilization is less than the threshold value, the load on the system may be small enough that dynamic tuning may not provide sufficient performance improvement to justify its use, and so the application is permitted to continue execution without modification.

If the CPU utilization exceeds the threshold, however, then system profiling and analysis may be initiated at operation 406. This may include an estimation of the application's throughput, which may be based, for example, on measured network traffic as described previously.

At operation 408, a determination is made as to whether the application scales at an acceptable level or whether it exhibits scalability problems. The estimated application throughput, from operation 406, is tracked over a selected time period and compared to CPU utilization. If the CPU utilization, or load on the system, is found to be increasing at a faster rate than the application throughput, then a scalability problem may exist. For example, if the measured utilization increases from 52% to 89% (an approximately 70 percent increase), but the estimated application throughput increases by only 40 percent, then it may be determined that a scalability problem exists. In other words, some degree of proportionality or linear relationship may be expected between utilization and throughput when an application scales well, and deviation from that degree of proportionality may indicate a scalability problem. The difference between the rate of increase of CPU utilization and the rate of increase of application throughput required to trigger detection of a scalability problem may be determined based on heuristics, experimentation or other suitable methods. This difference between rates of increase may be expressed as a scale factor, and a threshold scale factor may be selected to trigger detection of a scalability problem if the threshold is exceeded. In some embodiments, the threshold scale factor may be set to a value in the range of 1.2 to 1.3 to account for the fact that, although a theoretical value of 1.0 might be expected (indicating perfect proportionality between rate of increase of CPU utilization and the rate of increase of application throughput), in practice there may be measurement variations and noise.

If a scaling issue is detected, then at operation 410, a determination is made as to whether the scaling issue is caused by contention or by constrained resource sharing. In some embodiments, hardware performance counters may be accessed and read to obtain statistics about conflicts versus constraints and how they relate to the application execution, as described previously in connection with FIG. 3. If it is determined that scalability is being impacted by contention problem, then at operation 412, the application may be re-bound to a lesser number of CPUs. This reduces the opportunity for contention between CPUs executing components of the same application (e.g., reducing inter-CPU communication for locks, etc.). This may also free up some of those CPUs to execute other processes associated with other applications (which may improve overall system efficiency) or allow them to be idle (which may improve power consumption). This rebinding may be accomplished, for example under some kernels, by modifying a bit mask associated with the processes of the application.

If, however, it is determined that scalability is being impacted by resource constraints, then at operation 414, a further determination is made as to whether the identified resources are shared by multiple threads on the same core or by multiple cores on the same CPU. In the case of sharing by multiple threads on the same core (e.g., the shared resource is limited to a processing core), than at operation 416, hyperthreading is disabled. Otherwise, at operation 418, some of the cores on the CPU are disabled.

After tuning the application execution, as for example, at any of operations 412, 416 or 418, the application is allowed to continue execution, at operation 402. The application continues to be monitored and additional tuning or re-balancing may be performed as necessary, for example if conditions vary between contention and resource constraint. Furthermore, in some embodiments, if it is determined that tuning changes have an adverse (or relatively negligible) effect on performance, those changes can be rolled back or reversed.

Figure 5:
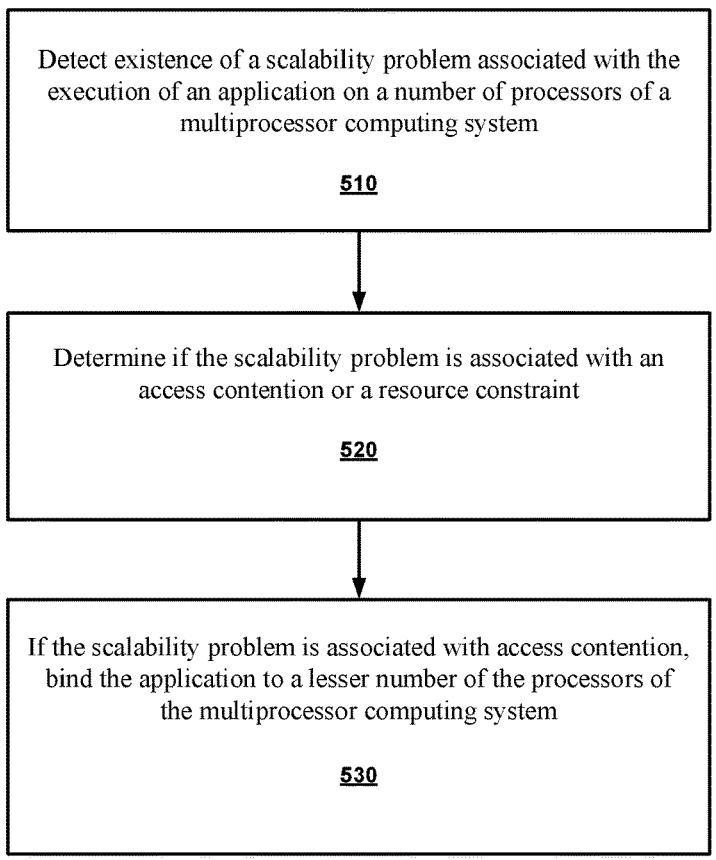
FIG. 5 illustrates a flowchart of operations of another example embodiment consistent with the present disclosure.

FIG. 5 illustrates a flowchart of operations 500 of another example embodiment consistent with the present disclosure. The operations provide a method for dynamic tuning of multiprocessor and multicore computing systems. At operation 510, the existence of a scalability problem associated with the execution of an application on the multiprocessor computing system is detected. At operation 520, a determination is made as to whether the scalability problem is associated with an access contention or a resource constraint. At operation 530, if the scalability problem is associated with access contention, the application is re-bound to a lesser number of processors of the multiprocessor computing system.

Figure 6:
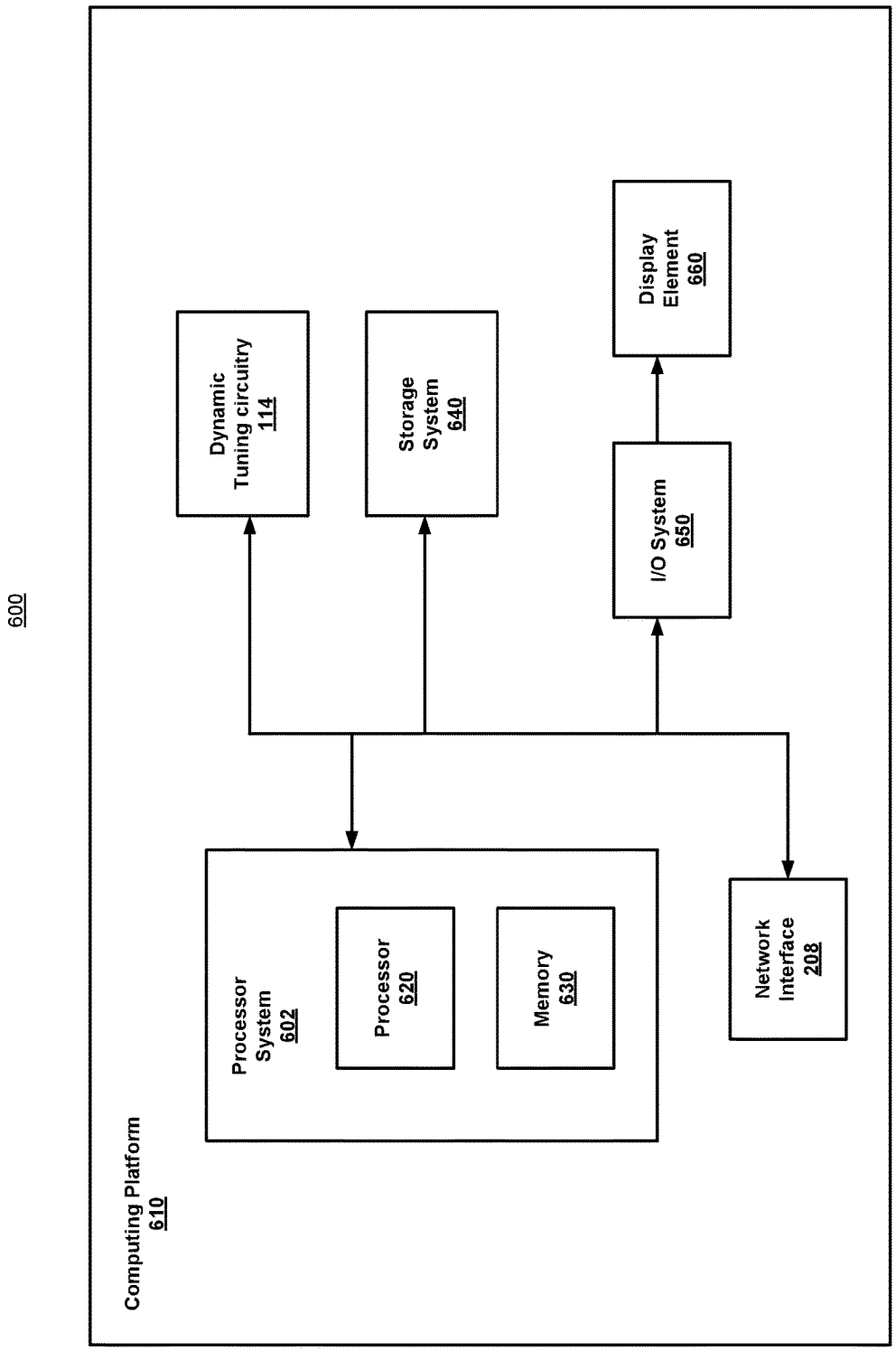
FIG. 6 illustrates a system diagram of a platform of another example embodiment consistent with the present disclosure.

FIG. 6 illustrates a system diagram 600 of one example embodiment consistent with the present disclosure. The system 600 may be a computing platform 610 such as, for example, a server, workstation or desktop computer. It will be appreciated, however, that embodiments of the system described herein are not limited to computing platforms, and in some embodiments, the system 600 may be a communication, entertainment or any other suitable type of device such as, for example, a smart phone, smart tablet, personal digital assistant (PDA), mobile Internet device (MID), convertible tablet, notebook or laptop computer. The device may generally present various interfaces to a user via a display element 660 such as, for example, a touch screen, liquid crystal display (LCD) or any other suitable display type.

The system 600 is shown to include a processor system 602 that may further include any number of processors 620 and memory 630. In some embodiments, the processors 620 may be implemented as any number of processor cores (e.g., HW cores). The processor (or processor cores) may be any type of processor, such as, for example, a general purpose processor, a micro-processor, an embedded processor, a digital signal processor (DSP), a graphics processor (GPU), a network processor, a field programmable gate array or other device configured to execute code. The processors may be multithreaded cores in that the HW cores may include more than one hardware thread context (or "logical core") per HW core. The memory 630 may be coupled to the processors. The memory 630 may be any of a wide variety of memories (including various layers of memory hierarchy and/or memory caches) as are known or otherwise available to those of skill in the art. It will be appreciated that the processors and memory may be configured to store, host and/or execute one or more user applications or other software. These applications may include, but not be limited to, for example, any type of business/enterprise, computation, communication, data management, data storage and/or user interface task. In some embodiments, these applications may employ or interact with any other components of the platform 610.

System 600 is also shown to include network interface circuitry 208 which may include wired or wireless communication capabilities, such as, for example, Ethernet, cellular communications, Wireless Fidelity (WiFi), Bluetooth®, and/or Near Field Communication (NFC). The network communications may conform to or otherwise be compatible with any existing or yet to be developed communication standards including past, current and future version of Ethernet, Bluetooth®, Wi-Fi and mobile phone communication standards.

System 600 is also shown to include an input/output (IO) system or controller 650 which may be configured to enable or manage data communication between processor 620 and other elements of system 600 or other elements (not shown) external to system 600. System 600 is also shown to include a storage system 640, which may be configured, for example, as one or more hard disk drives (HDDs) or solid state drives (SSDs).

System 600 is also shown to include dynamic tuning circuitry 114, coupled to the processor system 602, and configured to perform profiling/monitoring and scheduling/re-balancing of software applications, as described previously.

It will be appreciated that in some embodiments, the various components of the system 600 may be combined in a system-on-a-chip (SoC) architecture. In some embodiments, the components may be hardware components, firmware components, software components or any suitable combination of hardware, firmware or software.

"Circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices, methods and computer readable media for dynamic tuning of multiprocessor and multicore computing systems to improve application performance and scalability and decrease system power consumption. The following examples pertain to further embodiments.

According to Example 1 there is provided a system for multiprocessor tuning. The system may include: a plurality of processing units (CPUs); profiling circuitry to detect existence of a scalability problem associated with the execution of an application on the plurality of CPUs and determine if the scalability problem is associated with an access contention or a resource constraint; and scheduling circuitry to bind the application to a subset of the plurality of CPUs if the scalability problem is associated with the access contention.

Example 2 may include the subject matter of Example 1, and the profiling circuitry is further to determine if the resource is shared by multiple processing cores of one of the CPUs, if the scalability problem is associated with the resource constraint; and the scheduling circuitry is further to disable a subset of the multiple processing cores, if the resource sharing determination is true.

Example 3 may include the subject matter of Examples 1 and 2, and the profiling circuitry is further to determine if the resource is limited to a processing core of one of the CPUs, if the scalability problem is associated with the resource constraint; and the scheduling circuitry is further to disable hyperthreading on the processor core, if the resource limiting determination is true.

Example 4 may include the subject matter of Examples 1-3, and the profiling circuitry is further to detect existence of a scalability problem based on: measurement of a rate of increase of utilization of at least one of the CPUs; measurement of a rate of increase of throughput of the application; and determination that the rate of increase of utilization exceeds the rate of increase of throughput by a threshold scale factor.

Example 5 may include the subject matter of Examples 1-4, and the profiling circuitry is further to detect existence of a scalability problem based on determination that utilization of the at least one of the CPUs exceeds a threshold utilization value.

Example 6 may include the subject matter of Examples 1-5, and the throughput of the application is estimated based on measured network traffic associated with the application.

Example 7 may include the subject matter of Examples 1-6, and the access contention is a data access conflict or contention for a synchronization lock.

Example 8 may include the subject matter of Examples 1-7, and the resource constraint is associated with capacity of instruction pipeline buffers or capacity of cache memories.

Example 9 may include the subject matter of Examples 1-8, further including one or more performance counters to track events associated with hardware performance, and the profiling circuitry is further to determine if the scalability problem is associated with an access contention or a resource constraint based on a reading of one or more of the performance counters.

According to Example 10 there is provided a method for tuning a multiprocessor computing system. The method may include: detecting existence of a scalability problem associated with the execution of an application on a number of processors of the multiprocessor computing system; determining if the scalability problem is associated with an access contention or a resource constraint; and if the scalability problem is associated with the access contention, binding the application to a lesser number of the processors of the multiprocessor computing system.

Example 11 may include the subject matter of Example 10, further including, if the scalability problem is associated with the resource constraint: determining if the resource is shared by multiple processing cores of one of the processors; and if the determination is true, disabling a subset of the multiple processing cores. Example 12 may include the subject matter of Examples 10 and 11, further including, if the scalability problem is associated with the resource constraint: determining if the resource is limited to a processing core of one of the processors; and if the determination is true, disabling hyperthreading on the processing core.

Example 13 may include the subject matter of Examples 10-12, and the detecting existence of a scalability problem further includes: measuring a rate of increase of utilization of at least one of the processors; measuring a rate of increase of throughput of the application; and determining that the rate of increase of utilization exceeds the rate of increase of throughput by a threshold scale factor.

Example 14 may include the subject matter of Examples 10-13, and the detecting existence of a scalability problem further includes determining that utilization of the at least one of the processors exceeds a threshold utilization value.

Example 15 may include the subject matter of Examples 10-14, and the throughput of the application is estimated based on measured network traffic associated with the application.

Example 16 may include the subject matter of Examples 10-15, and the access contention is a data access conflict or contention for a synchronization lock.

Example 17 may include the subject matter of Examples 10-16, and the resource constraint is associated with capacity of instruction pipeline buffers or capacity of cache memories.

Example 18 may include the subject matter of Examples 10-17, and the determining if the scalability problem is associated with an access contention or a resource constraint further includes reading one or more counters to track events associated with hardware performance According to Example 19 there is provided at least one computer-readable storage medium having instructions stored thereon which when executed by a processor result in the following operations for tuning a multiprocessor computing system. The operations may include: detecting existence of a scalability problem associated with the execution of an application on a number of processors of the multiprocessor computing system; determining if the scalability problem is associated with an access contention or a resource constraint; and if the scalability problem is associated with the access contention, binding the application to a lesser number of the processors of the multiprocessor computing system.

Example 20 may include the subject matter of Example 19, further including, if the scalability problem is associated with the resource constraint: determining if the resource is shared by multiple processing cores of one of the processors; and if the determination is true, disabling a subset of the multiple processing cores.

Example 21 may include the subject matter of Examples 19 and 20, further including, if the scalability problem is associated with the resource constraint: determining if the resource is limited to a processing core of one of the processors; and if the determination is true, disabling hyperthreading on the processing core.

Example 22 may include the subject matter of Examples 19-21, and the detecting existence of a scalability problem further includes: measuring a rate of increase of utilization of at least one of the processors; measuring a rate of increase of throughput of the application; and determining that the rate of increase of utilization exceeds the rate of increase of throughput by a threshold scale factor.

Example 23 may include the subject matter of Examples 19-22, and the detecting existence of a scalability problem further includes determining that utilization of the at least one of the processors exceeds a threshold utilization value.

Example 24 may include the subject matter of Examples 19-23, and the throughput of the application is estimated based on measured network traffic associated with the application.

Example 25 may include the subject matter of Examples 19-24, and the access contention is a data access conflict or contention for a synchronization lock.

Example 26 may include the subject matter of Examples 19-25, and the resource constraint is associated with capacity of instruction pipeline buffers or capacity of cache memories.

Example 27 may include the subject matter of Examples 19-26, and the determining if the scalability problem is associated with an access contention or a resource constraint further includes reading one or more counters to track events associated with hardware performance According to Example 28 there is provided a system for tuning a multiprocessor computing system. The system may include: means for detecting existence of a scalability problem associated with the execution of an application on a number of processors of the multiprocessor computing system; means for determining if the scalability problem is associated with an access contention or a resource constraint; and if the scalability problem is associated with the access contention, means for binding the application to a lesser number of the processors of the multiprocessor computing system.

Example 29 may include the subject matter of Example 28, further including, if the scalability problem is associated with the resource constraint: means for determining if the resource is shared by multiple processing cores of one of the processors; and if the determination is true, means for disabling a subset of the multiple processing cores.

Example 30 may include the subject matter of Examples 28 and 29, further including, if the scalability problem is associated with the resource constraint: means for determining if the resource is limited to a processing core of one of the processors; and if the determination is true, means for disabling hyperthreading on the processing core.

Example 31 may include the subject matter of Examples 28-30, and the detecting existence of a scalability problem further includes: means for measuring a rate of increase of utilization of at least one of the processors; means for measuring a rate of increase of throughput of the application; and means for determining that the rate of increase of utilization exceeds the rate of increase of throughput by a threshold scale factor.

Example 32 may include the subject matter of Examples 28-31, and the detecting existence of a scalability problem further includes means for determining that utilization of the at least one of the processors exceeds a threshold utilization value.

Example 33 may include the subject matter of Examples 28-32, and the throughput of the application is estimated based on measured network traffic associated with the application.

Example 34 may include the subject matter of Examples 28-33, and the access contention is a data access conflict or contention for a synchronization lock.

Example 35 may include the subject matter of Examples 28-34, and the resource constraint is associated with capacity of instruction pipeline buffers or capacity of cache memories.

Example 36 may include the subject matter of Examples 28-35, and the determining if the scalability problem is associated with an access contention or a resource constraint further includes means for reading one or more counters to track events associated with hardware performance.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. One or more non-transitory computer-readable storage devices having stored thereon instructions which, when executed by at least one central processing unit (CPU) having a plurality of cores, result in operations comprising:
   determine a CPU utilization level of the at least one CPU during execution of an application by the CPU;
   compare the CPU utilization level to a threshold;
   determine an access contention state for the application, wherein the access contention state includes at least one of a lock contention related to the application or a data access conflict related to the application;
   determine a CPU resource state for the application, wherein the CPU resource includes at least one of cache memory of the CPU or execution buffers of the CPU; and
   determine, based at least in part on a result of the comparison of the CPU utilization, the contention state for the application and the CPU resource state for the application, whether to modify a number of disabled cores of the at least one CPU.

2. The one or more non-transitory computer-readable storage devices of claim 1, wherein the instructions, when executed by the at least one CPU, result in operations comprising:
   modify the number of disabled cores based on a result of the determination of whether to modify the number of disabled cores.

3. The one or more non-transitory computer-readable storage devices of claim 2, wherein the instructions, when executed by the at least one CPU, result in operations comprising:
   determine, after modifying the number of disabled cores, a new CPU utilization level; and
   determine, based at least in part on the new CPU utilization level, whether to further modify the number of disabled cores of the at least one CPU.

4. A method, comprising:
   determining a utilization level for at least one Central Processing Unit (CPU) having a plurality of cores during execution of an application by the CPU;
   comparing the CPU utilization level to a threshold;
   determining an access contention state for the application, wherein the access contention state includes at least one of a lock contention related to the application or a data access conflict related to the application;
   determining a CPU resource state for the application, wherein the CPU resource includes at least one of cache memory of the CPU or execution buffers of the CPU; and
   determining, based at least in part on a result of the comparison of the CPU utilization, the contention state for the application and the CPU resource state for the application, whether to modify a number of disabled cores of the at least one CPU.

5. The method of claim 4, further comprising:
   modifying the number of disabled cores based on a result of the determining of whether to modify the number of disabled cores.

6. The method of claim 5, further comprising:
   determining, after modifying the number of disabled cores, a new CPU utilization level; and determining, based at least in part on the new CPU utilization level, whether to further modify the number of disabled cores of the at least one CPU.

7. A system, comprising:

memory circuitry having stored thereon instructions;

at least one Central Processing Unit (CPU) having a plurality of cores, the CPU to execute the instructions to:

determine a CPU utilization level of the at least one CPU during execution of an application by the CPU;

compare the CPU utilization level to a threshold;

determine an access contention state for the application, wherein the access contention state includes at least one of a lock contention related to the application or a data access conflict related to the application;

determine a CPU resource state for the application, wherein the CPU resource includes at least one of cache memory of the CPU or execution buffers of the CPU; and determine, based at least in part on a result of the comparison of the CPU utilization, the contention state for the application and the CPU resource state for the application, whether to modify a number of disabled cores of the at least one CPU.

8. The system of claim 7, wherein:

the at least one CPU is further to execute the instructions to determine the degree of parallel execution of the application.

9. The system of claim 7, wherein the at least one CPU is further to execute the instructions to modify the number of disabled cores based on a result of the determination of whether or not to modify the number of disabled cores.

10. The system of claim 9, wherein the at least one CPU is further to execute the instructions to:

determine, after modifying the number of disabled cores, a new CPU utilization level; and determine, based at least in part on the new CPU utilization level, whether to further modify the number of disabled cores of the at least one CPU.

* * * * *